(12) United States Patent
Nagai

(10) Patent No.: US 11,912,866 B2
(45) Date of Patent: Feb. 27, 2024

(54) RUBBER COMPOSITION FOR ANTI-VIBRATION RUBBER AND AN ANTI-VIBRATION RUBBER

(71) Applicant: TOYO TIRE Corporation, Itami (JP)

(72) Inventor: Hama Nagai, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 555 days.

(21) Appl. No.: 17/124,809

(22) Filed: Dec. 17, 2020

(65) Prior Publication Data
US 2021/0179818 A1  Jun. 17, 2021

(30) Foreign Application Priority Data

Dec. 17, 2019 (JP) .................................. 2019-227193

(51) Int. Cl.
*C08L 7/00* (2006.01)
*F16F 1/36* (2006.01)
*B60K 5/12* (2006.01)

(52) U.S. Cl.
CPC .............. *C08L 7/00* (2013.01); *F16F 1/3605* (2013.01); *B60K 5/1208* (2013.01); *F16F 2224/025* (2013.01); *F16F 2226/04* (2013.01); *F16F 2228/002* (2013.01); *F16F 2228/007* (2013.01)

(58) Field of Classification Search
CPC ........ C08L 7/00; B60K 5/1208; F16F 1/3605; F16F 2224/025; F16F 2226/04; F16F 2228/002; F16F 2228/007
See application file for complete search history.

(56) References Cited

U.S. PATENT DOCUMENTS

2009/0171029 A1* 7/2009 Masaki .................. C08L 21/00
526/346

FOREIGN PATENT DOCUMENTS

| EP | 1323777 A1 | * | 7/2003 | ............ C08L 19/006 |
| EP | 3312228 A1 | * | 4/2018 | ............ C08J 3/203 |
| EP | 3252098 B1 | * | 12/2018 | ............ C08K 3/06 |
| JP | 2003-253056 A | | 9/2003 | |
| JP | 5401988 B2 | * | 1/2014 | ............ A43B 13/04 |

OTHER PUBLICATIONS

English machine translation of JP 5401988 (Year: 2014).*

* cited by examiner

*Primary Examiner* — Angela C Scott
(74) *Attorney, Agent, or Firm* — WHDA, LLP

(57) ABSTRACT

The present invention provides a rubber composition for anti-vibration rubber which can achieve a balance of a low dynamic magnification and a high dampening property when it is made into an anti-vibration rubber, as well as provides an anti-vibration rubber obtained from the rubber composition for anti-vibration rubber as a raw material. The object can be solved by a rubber composition for anti-vibration rubber, including: when a rubber component included in the rubber composition is assumed to be 100 parts by mass, 10 to 30 parts by mass of a polystyrene butadiene rubber; and 40 to 00 parts by mass of at least one kind selected from the group consisting of a natural rubber and a polyisoprene rubber. It is preferable to provide an anti-vibration rubber formed through vulcanization of the rubber composition for anti-vibration rubber, and that it has a peak of tan δ at 10° C. or more.

4 Claims, No Drawings

RUBBER COMPOSITION FOR ANTI-VIBRATION RUBBER AND AN ANTI-VIBRATION RUBBER

Technical Field

The present invention relates to a rubber composition for anti-vibration rubber. The present invention particularly relates to a rubber composition for anti-vibration rubber which can be used as an anti-vibration component such as an engine mount for automotive, as well as an anti-vibration rubber.

BACKGROUND OF THE INVENTION

An anti-vibration rubber has been used in vehicles such as automobiles in order to absorb the vibration of the engine and the body. Therefore, in such an anti-vibration rubber, it is demanded to achieve a low dynamic magnification and a high dampening property.

Patent Reference No. 1 discloses a rubber composition including 5 to 40 parts by weight of a styrene butadiene type copolymerization rubber which has a weight average molecular weight of 200,000 or less and a glass transition temperature of −35° C or more.

PRIOR ART REFERENCES

Patent References

Patent Reference No. 1: Japanese Laid-Open Patent Publication No. 2003-253,056

SUMMARY OF THE INVENTION

The Objectives To Be Solved By The Invention

The inventor of the present application has zealously considered the conventional art as mentioned above, and as a result, it has been found that there is insufficient balance of the low dynamic magnification and the high dampening property when it is made into an anti-vibration rubber, and therefore, there is a room for making further improvement.

The present invention has been accomplished in view of the fact as mentioned above, and its purpose is to provide a rubber composition for anti-vibration rubber which can achieve a balance of a low dynamic magnification and a high dampening property when it is made into an anti-vibration rubber, as well as to provide an anti-vibration rubber which can be obtained from the rubber composition for anti-vibration rubber as a raw material.

Means To Solve The Problem

The object as mentioned above can be solved by the following configuration. That is, it relates to a rubber composition for anti-vibration rubber, including: when a rubber component included in the rubber composition is assumed to be 100 parts by mass, 10 to 30 parts by mass of a polystyrene butadiene rubber; and 40 to 90 parts by mass of at least one kind selected from the group consisting of a natural rubber and a polyisoprene rubber.

In the rubber composition for anti-vibration rubber, it is preferable that the polystyrene butadiene rubber has a glass transition temperature of −15 to 20° C.

In the rubber composition for anti-vibration rubber, it is preferable that the polystyrene butadiene rubber has a mass average molecular weight of 200,000 or more.

In the rubber composition for anti-vibration rubber, it is preferable that when the rubber component included in the rubber composition is assumed to be 100 parts by mass, the rubber composition further includes 20 to 40 parts by mass of silica and 5 to 15 parts by mass of carbon black.

Also, the present invention relates to an anti-vibration rubber which is termed in shape through vulcanization of the rubber compositions for anti-vibration rubber as mentioned above. Among the anti-vibration rubbers as mentioned above, it is preferable to have a peak of tan δ in a temperature range of 10 ° C. or more.

Effects Of The Invention

The rubber composition for anti-vibration rubber of the present invention includes: 10 to 30 parts by mass of a polystyrene butadiene rubber; and 40 to 90 parts by mass of at least one kind selected from the group consisting of a natural rubber and a polyisoprene rubber, when a rubber component included in the rubber composition is assumed to be 100 parts by mass. As a result, when the rubber composition for anti-vibration rubber is formed in a shape through vulcanization to make an anti-vibration rubber, it is possible to achieve a balance of the low dynamic magnification and the high dampening property. In the present invention, it is preferable that the polystyrene butadiene rubber has a glass transition temperature of −15 to 20° C. Furthermore, it is preferable that the polystyrene butadiene rubber has a mass average molecular weight of 200,000 or more. In this case, an improvement of a dampening property especially when it is made into an anti-vibration rubber can be expected.

The anti-vibration rubber of the present invention has a low dynamic magnification and is superior in the damping property. Particularly when it is constituted by a vulcanized rubber having a peak of tan δ in a temperature range of 10° C. or more, it is preferable that the damping property can be further improved when it is measured at, for example, at 15 Hz.

EMBODIMENTS TO CARRY OUT THE INVENTION

The rubber composition for anti-vibration rubber of the present invention includes: 10 to 30 parts by mass of a polystyrene butadiene rubber; and 40 to 90 parts by mass or at least one Kind selected from the group consisting of a natural rubber and a polyisoprene rubber, when a rubber component included in the rubber composition is assumed to be 100 parts by mass.

The polystyrene butadiene rubber which can be preferably used has a glass transition temperature (Tg) of −15 to 20° C., and more preferably has a glass transition temperature (Tg) of −10 to 20° C. By using an SBR having a Tg within the range identified above, the peak of tan δ can tend to fall within a temperature range of 10° C. or more when it is made into a vulcanized rubber. As a result, the damping property when it is made into an anti-vibration rubber can tend to particularly improve. It is noted that the present invention uses plural rubber components, or more in details, a polystyrene butadiene rubber, and at least one kind selected from the group consisting of a natural rubber and a polyisoprene rubber. Therefore, plural peaks of tan δ can tend to be observed when it is made into a vulcanized rubber. The peak of tan δ derived from the polystyrene butadiene rubber can tend to be observed at a side of a higher temperature. In the present invention, when the peak of tan δ derived from the polystyrene butadiene rubber is in a temperature range of 10° C. or more, the damping property when it is made into an anti-vibration rubber can tend to be particularly improved.

Furthermore, when using a polystyrene butadiene rubber (SBR) having a mass average molecular weight of 200,000 or more, and more preferably of 1 million or more, it is preferable as it can achieve a good balance of a low dynamic magnification and a high dampening property when it is made into an anti-vibration rubber. The upper limit of the mass molecular weight of the SBR can be, for example, 2 million or less in view of considering processability at the time of blend kneading of the rubber. Also, an oil derivation product as the SBR can be used in view of improving the processability of a rubber composition.

In addition to 10 to 30 parts by mass of a polystyrene butadiene rubber, the rubber composition for anti-vibration rubber of the present invention includes 40 to 90 parts by mass of at least one kind selected from the group consisting of a natural rubber (NR) and a polyisoprene rubber (IR), when a rubber component included in the rubber composition is assumed to be 100 parts by mass. Furthermore, it is preferable to include 70 to 90 parts by mass of at least one kind selected from the group consisting of a natural rubber (NR) and a polyisoprene rubber (IR). When including SBR, NR and IR in predetermined blending amounts, additional rubber component other than these can be included. The examples of such additional rubber component can include synthetic rubbers including: a diene type synthetic rubber such as butadiene rubber (BR), butyl rubber (IIR) and acrylonitrile butadiene rubber (NBR); a halogenated butyl rubber such as brominated butyl rubber (BR-IIR); and others such as polyurethane rubber, acrylic rubber, fluorine rubber, silicon rubber and chlorosulfonated polyethylene, etc.

It is preferable that the rubber composition for anti-vibration rubber of the present invention can include silica. While the rubber composition for anti-vibration rubber of the present invention includes SBR as explained above, the addition of the SBR can tend to raise a dynamic magnification of a vulcanized rubber. However, further addition of silica can reduce a content of SBR, thereby restraining the increase of the dynamic magnification of the vulcanized rubber. The examples of the silica to be used can include wet process silica, dry process silica, colloidal silica, and sedimentation silica, etc. Particularly, it is preferable to use wet process silica composed primarily of hydrated silicate. When assuming a total quantity of the rubber component is 100 parts by mass, it is preferable that silica is added at a blending amount of 20 to 40 parts by mass.

When using silica in the present invention, a silane coupling agent can be used, if necessary. The examples of the coupling agent to be usable can include bis(3-triethoxy silyl propyl) tetrasulfide, bis(3-triethoxy silyl propyl) disulfide, bis (2-triethoxy silyl ethyl) tetrasulfide, 3-mercaptopropyl trimethoxy silane, 3-mercaptopropyl triethoxy silane, 3-nitro propyl trimethoxy silane, and γ-amino propyl triethoxy silane, etc. When using a silane coupling agent, it can be added at a blending amount of 3 to 15 mass %, and more preferably of 5 to 10 mass %, with respect to the blending amount of silica.

It is preferable that the rubber composition for anti-vibration rubber of the present invention can include carbon black. The examples of the carbon black to be used can include, for example, SAF grade (N100 series in the ASTM number), ISAF grade (N200th series in the ASTM number), HAF grade (300th series in the ASTM number), FEF grade (N500th series in the ASTM number), GPF grade (N600th series in the ASTM number), and SRF grade (700th series in the ASTM number), which can be used in the rubber industries. Regarding carbon black, it can be possible to use granulated carbon black which have been granulated in view of consideration the handling characteristics in the rubber industries, but it can be alternatively possible to use non-granulated carbon black. It is preferable to use a combination of silica and carbon black in the present invention. Assuming that a total quantity of the rubber components is 100 parts by mass, it is preferable that the blending amount of the silica is 20 to 40 parts by mass, and that the content of the carbon black is 5 to 15 parts by mass.

Along with the rubber components as mentioned above, the rubber composition for anti-vibration rubber of the present invention can appropriately include, if necessary, silica, carbon black, a silane coupling agent, a sulfur type vulcanization agent, a vulcanization accelerator, stearic acid, a vulcanization acceleration assistant agent, a vulcanized delay agent, an anti oxidant, a softener such as wax and oil, and a processing aid, etc. which are used in the rubber industries, provided that they do not adversely affect the effects of the present invention.

It is preferable that the rubber composition for anti-vibration rubber of the present invention can include sulfur type vulcanization agent. The sulfur type vulcanization agent can be sulfur for rubbers, and the examples thereof can include powdery sulfur, sedimentation sulfur, insoluble sulfur, high dispersibility sulfur, etc.

The examples of the vulcanization accelerator can include a sulfenamide type vulcanization accelerator, a thiram type vulcanization accelerator, a thiazole type vulcanization accelerator, a thiourea type vulcanization accelerator, a guanidine type vulcanization accelerator, and a dithiocarbamate type vulcanization accelerator, etc., which can be used alone or in appropriate combination thereof.

The examples of the antioxidant can include an aromatic amine type antioxidant, an amine ketone type antioxidant, a monophenol type antioxidant, a bisphenol type antioxidant, a polyphenol type anti oxidant, a dithiocarbamate type anti oxidant, and a thiourea type antioxidant, etc., which are used in the rubber industries, one of which can be used alone or in appropriate combination thereof.

The rubber composition for anti-vibration rubber of the present invention can be obtained by appropriately blending and kneading the rubber components as mentioned above along with, if necessary, agents such as silica, carbon black, a silane coupling agent, a sulfur type vulcanization agent, a vulcanization accelerator, stearic acid, a vulcanization acceleration assistant agent, a vulcanization delay agent, an antioxidant, a softener such as wax and oil, and a processing aid, etc. which are used in the rubber industries, by means or a blending kneader such as Banbury Mixer, a kneader and a roll used in the rubber industries.

As one embodiment, the rubber composition of the present invention may or may not include an oil.

For example, a blending method of components as mentioned above can be carried out by making in advance a master batch by blending and kneading the blending components except for vulcanization type agents such as a sulfur type vulcanization agent and a vulcanization accelerator, followed by adding the remaining components therein to continue further kneading; or alternatively, it can be carried out by adding all the components at the same time to knead them.

After blending and kneading the components followed by molding and processing, a vulcanization is carried out to produce an anti-vibration rubber having a high which was made high dampening property. For example, it is preferable to adopt a vulcanization temperature of 120 to 200° C., and more preferably a vulcanization temperature of 140 to 180° C.

The examples of the application of the anti-vibration rubber of the present invention can include various anti-vibration rubbers for automobiles such as an engine mount, a strut mount, a body mount, a cab mount, a member mount, a mount such as diff mount, a bushing such as suspension bushing, arm bushing and torque bushing, a torsional damper, a muffler hanger, a damper pulley, and a dynamic damper, etc. Other than the applications for automobiles, it can be preferably used as an anti-vibration rubber for railroad carriages, an anti-vibration rubber for industrial equipment, an anti-vibration or seismic isolation rubber such as seismic isolation rubber bearing, etc.

EXAMPLES

The examples of the present invention are described next.

Preparation of Rubber Composition

With respect to 100 parts by mass of rubber component(s), the components were blended in accordance with the prescription shown in Table 1. Using a Banbury Mixer, the components were kneaded to prepare the rubber compositions in accordance with Examples 1 to 4 and Comparative Example 1. Each of the agents described in Table 1 are explained below.

a) The "natural rubber (NR)" is RSS #3.
b) The "polystyrene butadiene rubber 1 (SBR-1)" is a solution polymerization polystyrene butadiene rubber, having a glass transition temperature (Tg) of −10° C., and a mass average molecular weight Mw of 1,160,000, that is a 37.5 phr oil extension product, whose commercial name is "SE6233" manufactured by Sumitomo Chemical Co., Ltd.
c) The "polystyrene butadiene rubber 2 (SBR-2)" is a solution polymerization polystyrene butadiene rubber, having a glass transition temperature (Tg) of −4° C., and a mass average molecular weight Mw of 1,200,000, that is a 44.0 phr oil extension product, whose commercial name is "SE6529" manufactured by Sumitomo Chemical Co., Ltd.
d) The "carbon black" is a commercial name, "SEAST V," manufactured by Tokai Carbon Co., Ltd.
e) The "silica" is a commercial name "NIPSIL AQ," manufactured by Tosoh Silica Corporation.
f) The "silane coupling agent" is a commercial name "NXT," manufactured by Momentive Performance Inc.
g) The "oil" is a commercial name "NC140," manufactured by JX Nippon Oil & Energy Co., Ltd.
h) The "stearic acid" is a commercial name "stearic acid for industrial use," manufactured by KAO Corporation.
i) The "zinc oxide" is the third type of zinc oxide manufactured by Mitsui Mining And Smelting Company.
j) The "wax" is a commercial name "OZOACE2701," manufactured by Nippon Seiro Co., Ltd.
k) The "antioxidant" is NOCRAC 6C manufactured by Ouchi Shinko Chemical Industrial Co., Ltd.
l) The "sulfur" is a commercial name "5% oil treated 150 mesh processed powder product," manufactured by Tsurumi Chemical Industry Co., Ltd.
m) The "vulcanization accelerator 1" is a commercial name "NOCCELER TT," manufactured by Ouchi Shinko Chemical Industrial Co., Ltd.
n) The "vulcanization accelerator 2" is a commercial name "NOCCELER DM,"manufactured by Ouchi Shinko Chemical Industrial Co., Ltd.
o) The "crosslinking assistant" is a commercial name "BMI," manufactured by K-I Chemical Industry Co., LTD.

Examples 1 to 4. and Comparative Example 1

Each rubber composition was evaluated by the following conditions.

Damping Property

A predetermined mold was used to vulcanize each rubber composition at 170° C. for 17 minutes to obtain a vulcanized rubber sample having a column shape (50 mm in diameter and 25 mm in height), which was vibrated at a condition of 23±2° C., a frequency of 15 Hz, an amplitude of ±2% to measure tan δ. The result of Comparative Example 1 was assumed to be 100, and an evaluation was made by an index. As the index becomes larger, the damping property of the vulcanized rubber is high, therefore meaning that it is more superior to. The results are shown in Table 1.

Furthermore, the temperature when a peak value of tan δ derived from polystyrene butadiene rubber (SBR-tan δ peak value temperature) was indicated is in Table 1. It is noted that in Comparative Example 1, it did not include polystyrene butadiene rubber as a rubber component, a tan δ peak derived from polystyrene butadiene rubber was not observed in Comparative Example 1.

Dynamic Magnification

Static Spring Constant (Ks)

A pair of columnar metal fittings (60 mm in diameter, and 6 mm in thickness) were bonded to the upper surface and the lower surface of the rubber sample by using an adhesive to obtain a test piece. The test piece thus prepared was twice compressed by 5 mm in the column axial direction. Then, from a load deflection curve when the distortion was restored, deflection loads at 1.25 mm and 3.75 mm were measured, from which a static spring constant (Ks) (N/mm) was calculated.

Dynamic Spring Constant (Kd)

The test piece which had been used in measuring the static spring constant (Ks) was compressed by 2.5 mm in the column axial direction. Making the position compressed by 2.5 mm as a center, a constant displacement harmonized compression vibration having a frequency of 100 Hz and an amplitude of 0.05 mm was applied from the lower part. A dynamic load was detected at the upper load cell, thereby calculating a dynamic spring constant (Kd) (N/mm) in accordance with JIS-K6394.

Dynamic Magnification Kd/Ks

The dynamic magnification was calculated by the following formula:

(dynamic magnification)=(dynamic spring constant $(Kd)$)/ (static spring constant $(Ks)$)

Assuming that the result of Comparative Example 1 is 100, the evaluation was made by an index evaluation. As the index becomes smaller, the dynamic magnification of the vulcanized rubber is lower, thereby meaning that it is more superior. The results are shown in Table 1.

The results are shown in Table 1.

TABLE 1

|  | Comp. Ex. 1 | Ex. 1 | Ex. 2 | Ex. 3 | Ex. 4 |
|---|---|---|---|---|---|
| Composition |  |  |  |  |  |
| NR | 100 | 85 | 85 | 75 | 85 |
| SBR-1 (a rubber component) | 0 | 15 | 15 | 25 | 0 |
| SBR-2 (a rubber component) | 0 | 0 | 0 | 0 | 15 |
| carbon black | 49 | 15 | 5 | 10 | 10 |
| silica | 0 | 27 | 35 | 35 | 35 |
| silane coupling agent | 0 | 2.2 | 2.8 | 2.8 | 2.8 |
| oil | 6 | 0 | 0 | 0 | 0 |
| stearic acid | 1 | 1 | 1 | 1 | 1 |
| zinc oxide | 5 | 5 | 5 | 5 | 5 |
| antioxidant | 2 | 2 | 2 | 2 | 2 |
| wax | 2 | 2 | 2 | 2 | 2 |
| sulfur | 0.3 | 0.3 | 0.3 | 0.3 | 0.3 |
| vulcanization accelerator 1 | 0.5 | 0.5 | 0.5 | 0.5 | 0.5 |
| vulcanization accelerator 2 | 2 | 2 | 2 | 2 | 2 |
| crosslinking assistant | 1.5 | 1.5 | 1.5 | 1.5 | 1.5 |
| (Properties) |  |  |  |  |  |
| INDEX Kd100/Ks | 100 | 92 | 94 | 96 | 96 |
| INDEX tan δ (15 Hz) | 100 | 136 | 133 | 146 | 146 |
| SBB-tan δ peak temperature (° C.) | — | 26 | 28 | 19 | 26 |

The result in Table 1 shows that the vulcanized rubbers of the rubber compositions of Examples 1 to 4 had a good balance of a low dynamic magnification and a high dampening property.

Table 1 shows that the tan δ (15 Hz) of the vulcanized rubbers of the rubber compositions of Examples 1 to 4 was higher than that of Comparative Example 1 (tan δ (15 Hz)=100), meaning that these vulcanized rubbers had a high damping property. Assuming that Comparative Example 1 has a tan δ (15 Hz) of 100, for example, it is preferable that a tan δ (15 Hz) of the vulcanized rubber of the rubber composition of the present invention is in a range of 110 or more, and more preferably in a range of 120 to 160, and yet more preferably in a range of 130 to 150, and furthermore preferably in a range of 133 to 146.

Table 1 shows that the dynamic magnification (Kd100/Ks) of the vulcanized rubbers of the rubber compositions of Examples 1 to 4 was smaller than that of Comparative Example 1 (Kd100/Ks=100), meaning that these vulcanized rubbers were excellent. Assuming that Comparative Example 1 has a dynamic magnification (Kd100/Ks) of 100, it is preferable that the dynamic magnification (Kd100/Ks) of the vulcanized rubber of the rubber composition of the present invention is in a range of 99 or less, and more preferably in a range of 50 to 98, and yet more preferably in a range of 38 to 93, and furthermore preferably in a range of 92 to 36.

What is claimed is:

1. A rubber composition for anti-vibration rubber, wherein a rubber component included in the rubber composition consists of:
    15 to 25 parts by mass of a polystyrene butadiene rubber; and
    75 to 85 parts by mass of at least one kind selected from the group consisting of a natural rubber and a polyisoprene rubber,
    wherein the polystyrene butadiene rubber has a glass transition temperature of −15 to 20° C.,
    wherein the polystyrene butadiene rubber has a mass average molecular weight of 1,000,000 or more.

2. The rubber composition for anti-vibration rubber according to claim 1, comprising:
    100 parts by mass of the rubber component;
    20 to 40 parts by mass of silica; and
    5 to 15 parts by mass of carbon black.

3. An anti-vibration rubber which is formed in shape through vulcanization of the rubber composition for anti-vibration rubber according to claim 1.

4. The anti-vibration rubber according to claim 3, having a peak of tan δ in a temperature range of 10° C. or more.

* * * * *